US012805486B2

(12) United States Patent
West

(10) Patent No.: US 12,805,486 B2
(45) Date of Patent: Nov. 24, 2026

(54) APPARATUS FOR ATTRACTION AND DISPOSITION OF REPTILES

(71) Applicant: Atwell West, Richardson, TX (US)

(72) Inventor: Atwell West, Richardson, TX (US)

( * ) Notice: Subject to any disclaimer, the term of this patent is extended or adjusted under 35 U.S.C. 154(b) by 0 days.

(21) Appl. No.: 19/290,883

(22) Filed: Aug. 5, 2025

(65) Prior Publication Data

US 2026/0033482 A1 Feb. 5, 2026

Related U.S. Application Data

(60) Provisional application No. 63/679,265, filed on Aug. 5, 2024.

(51) Int. Cl.
*A01K 15/00* (2006.01)
*H05B 3/03* (2006.01)

(52) U.S. Cl.
CPC ............. *A01K 15/003* (2013.01); *H05B 3/03* (2013.01)

(58) Field of Classification Search
CPC ... A01K 15/003; A01M 23/26; A01M 23/265; A01M 23/34
See application file for complete search history.

(56) References Cited

U.S. PATENT DOCUMENTS

| | | | | |
|---|---|---|---|---|
| 2,807,495 A * | 9/1957 | Pillstrom | A01K 15/003 | 119/807 |
| 6,684,562 B1 * | 2/2004 | Schade | A01K 15/003 | 43/87 |
| 11,033,017 B2 * | 6/2021 | Higgins | A01M 23/08 | |
| 11,503,821 B2 * | 11/2022 | Broskey | A01M 23/16 | |
| 2008/0257279 A1 * | 10/2008 | Jezl | A01K 15/003 | 119/801 |
| 2013/0327281 A1 * | 12/2013 | Michels | A01K 15/003 | 294/24 |

* cited by examiner

*Primary Examiner* — Michael H Wang
(74) *Attorney, Agent, or Firm* — Edwin S. Flores; Daniel J. Chalker; Chalker Flores, LLP

(57) ABSTRACT

Provided herein is an apparatus for attraction and disposition of reptiles, including a heat source disposed on or near the manipulator arm or on a platform; a manipulator arm comprising a gripper and an arm imager, wherein the manipulator arm is disposed on the heat source or on the platform; and one or more control units connected physically or wirelessly to the heat source, the manipulator arm, the arm imager, or a combination thereof.

2 Claims, 12 Drawing Sheets

APPARATUS FOR ATTRACTION AND DISPOSITION OF REPTILES

CROSS-REFERENCE TO RELATED APPLICATIONS

This application claims priority to U.S. Provisional Application Ser. No. 63/679,265, filed Aug. 5, 2024, the entire contents of which are incorporated herein by reference.

STATEMENT OF FEDERALLY FUNDED RESEARCH

None.

TECHNICAL FIELD OF THE INVENTION

The present invention relates in general to wildlife management and more particularly, to management of reptiles.

BACKGROUND OF THE INVENTION

Without limiting the scope of the invention, its background is described in connection with particular embodiments of the present invention that permit attraction and disposition of reptiles.

Game wardens, research groups, snake hunters, and others need to be able to attract and catch reptiles for population control, study, commercial uses, and other uses. Such population control, study, commercial uses, and other uses include immobilization, euthanasia, and capture of reptiles. The reptiles of interest include a wide variety of species, e.g., snakes generally, alligators, iguanas, and Argentine tegu lizards, but a specific non-limiting example is the Burmese python, which is of interest in terms of population control and scientific research in places like the Florida wetlands. It is desirable to have a relatively low-cost apparatus that can attract reptiles and catch them for disposition by immobilization, euthanasia, and capture.

SUMMARY OF THE INVENTION

As embodied and broadly described herein, an aspect of the present disclosure relates to an apparatus for attraction and disposition of reptiles, including a heat source disposed on or near a manipulator arm or on a platform; the manipulator arm, including a gripper and an arm imager, wherein the manipulator arm is disposed on the heat source or on the platform; and one or more control units connected physically or wirelessly to the heat source, the manipulator arm, the arm imager, or a combination. In one aspect, the apparatus further includes a capture imager disposed near the heat source. In another aspect, one of the control units is connected physically or wirelessly to the capture imager. In another aspect, the manipulator arm includes articulated segments, a telescoping segment, or a combination. In another aspect, the heat source includes an electric heater, an engine, or a reservoir of heated liquid. In another aspect, the manipulator arm further includes an electrical source and one or more electrodes; or one or more reservoirs and one or more injection needles. In another aspect, the apparatus further includes a scent decoy disposed near the heat source. In another aspect, the apparatus further includes a motion detector decoy disposed near the heat source. In another aspect, the platform is a stationary platform or a movable platform. In another aspect, the movable platform is a wheeled vehicle, a tracked vehicle, or a waterborne vehicle.

As embodied and broadly described herein, another aspect of the present disclosure relates to a kit for an apparatus for attraction and disposition of reptiles, including a heat source disposed on or near a manipulator arm or on a platform; the manipulator arm, including a gripper and an arm imager, wherein the manipulator arm is disposed on the heat source or on the platform; and one or more control units connected physically or wirelessly to the heat source, the manipulator arm, the arm imager, or a combination. In one aspect, the kit further includes a capture imager configured to be disposed near the heat source. In another aspect, one of the control units is connectable physically or wirelessly to the capture imager. In another aspect, the manipulator arm includes articulated segments, a telescoping segment, or a combination. In another aspect, the heat source includes an electric heater, an engine, or a reservoir of heated liquid. In another aspect, the manipulator arm further includes an electrical source and one or more electrodes; or one or more reservoirs and one or more injection needles. In another aspect, the kit further includes a scent decoy configured to be disposed near the heat source. In another aspect, the kit further includes a motion detector decoy configured to be disposed near the heat source. In another aspect, the platform is a stationary platform or a movable platform. In another aspect, the movable platform is a wheeled vehicle, a tracked vehicle, or a waterborne vehicle.

As embodied and broadly described herein, another aspect of the present disclosure relates to a method for attraction and disposition of reptiles, including providing an apparatus for attraction and disposition of reptiles, including a heat source disposed on or near a manipulator arm or on a platform; the manipulator arm, including a gripper and an arm imager, wherein the manipulator arm is disposed on the heat source or on the platform; and one or more control units connected physically or wirelessly to the heat source, the manipulator arm, the arm imager, or a combination; activating the heat source to attract a reptile; and gripping the reptile with the gripper. In one aspect, the apparatus further includes a capture imager disposed near the heat source; and the method further includes making an image using the capture imager. In another aspect, one of the control units is connected physically or wirelessly to the capture imager. In another aspect, the manipulator arm includes articulated segments, a telescoping segment, or a combination. In another aspect, the heat source includes an electric heater, an engine, or a reservoir of heated liquid. In another aspect, the manipulator arm further includes an electrical source and one or more electrodes; or one or more reservoirs and one or more injection needles; and the method further includes using the one or more electrodes, or one or more reservoirs and one or more injection needles, to stun or euthanize the reptile. In another aspect, the apparatus further includes a scent decoy; and the method further includes attracting the reptile with the scent decoy. In another aspect, the apparatus further includes a motion sensor; and the method further includes detecting motion of the reptile with the motion sensor. In another aspect, the platform is a stationary platform or a movable platform. In another aspect, the platform is a wheeled vehicle, a tracked vehicle, or a waterborne vehicle.

As embodied and broadly described herein, another aspect of the present disclosure relates to a hand-held apparatus for attraction and disposition of reptiles, including a hand-held rod; a control panel mounted at a proximal end of the hand-held rod; a battery mounted on the hand-held rod; a gripper or a snare mounted at a distal end of the hand-held rod; a heat source connected to the battery; and an electric shock device connected to the battery.

As embodied and broadly described herein, another aspect of the present disclosure relates to a providing a hand-held apparatus for attraction and disposition of reptiles, including a hand-held rod; a control panel mounted at a proximal end of the hand-held rod; a battery mounted on the hand-held rod; a gripper or a snare mounted at a distal end of the hand-held rod; a heat source connected to the battery; and an electric shock device connected to the battery; activating the heat source to attract a reptile; and gripping the reptile with the gripper or snaring the reptile with the snare.

BRIEF DESCRIPTION OF THE DRAWINGS

For a more complete understanding of the features and advantages of the present invention, reference is now made to the detailed description of the invention along with the accompanying figures and in which:

FIG. 1A shows a chassis similar to a zero-turn tractor mower. FIG. 1B shows an air boat.

FIG. 2A shows an embodiment of the present invention disposed on a compact mini-bulldozer. FIG. 2B shows an embodiment of the present invention disposed on an air boat. FIG. 2C shows an embodiment of the present invention disposed on a bulldozer. FIG. 2D shows an embodiment of the present invention disposed on a tracked vehicle. FIG. 2E shows an embodiment of the present invention on a another tracked vehicle.

DETAILED DESCRIPTION OF THE INVENTION

Figure 1A:
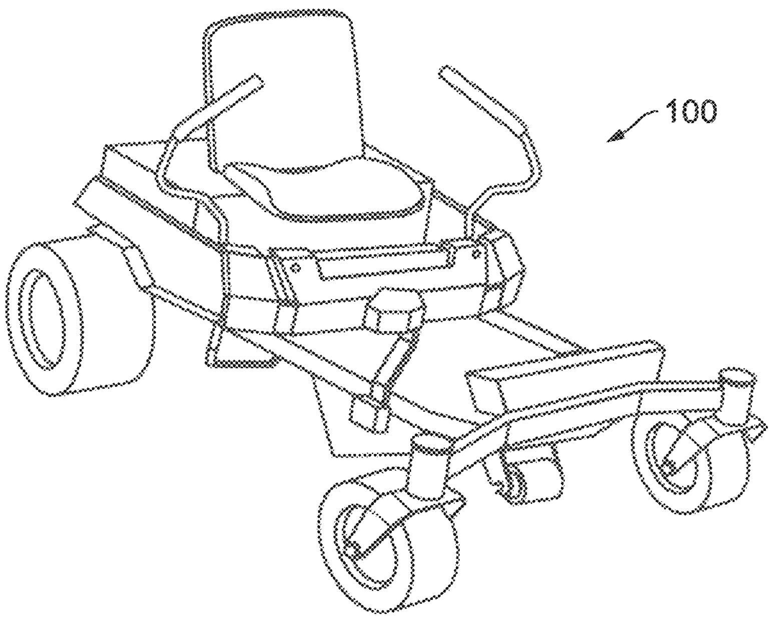
FIGS. 1A and 1B show non-limiting examples of platforms on which embodiments of the present invention can be disposed.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

In general terms, embodiments of the present invention include an apparatus for attraction and disposition of reptiles, configured to be disposed on a platform. While the embodiments illustrated and discussed herein are disposed on movable platforms including wheeled vehicles, tracked vehicles, and waterborne vehicles, embodiments can also be disposed on stationary platforms. Embodiments of the present invention include a heat source and a manipulator arm. The heat source, which can include, e.g., an electric heater, an engine, or a reservoir of heated liquid such as water, simulates a prey mammal and attracts a reptile to within range of a manipulator arm. The heat source can be disposed on or near the manipulator arm or on the platform. The manipulator arm can be disposed on the platform or on the heat source. The manipulator arm can include articulated segments, telescoping segments, or some combination. The manipulator arm includes at least one arm imager, e.g., a camera, to assist an operator in directing the manipulator arm to a reptile. The manipulator arm also includes one or more devices for disposition of the reptile. Non-limiting examples include a gripper for gripping the reptile or a snare for snaring the reptile; one or more electrical sources, e.g., one or more batteries, and electrodes for immobilizing the reptile by stunning it with an electric shock, e.g., an electric shock device such as a TASER® electric shock device; and one or more reservoirs and one or more injection needles for delivering an anesthetic substance or a euthanizing substance to the reptile. Embodiments of the present invention can also include a capture imager, e.g., a second camera, disposed near the heat source to image a capture of the reptile.

Further, embodiments of the present invention can include a scent decoy that generates and releases a scent to attract reptiles, disposed near the heat source. Embodiments of the present invention can also include one or more motion detectors disposed near the heat source to alert a user of the apparatus to the presence of a reptile.

Embodiments of the present invention further include one or more control units for operating components of the apparatus as described herein, connected physically or wirelessly to the components. In addition, embodiments of the present invention can be disposed on remotely controlled vehicles, with user control for such a vehicle connected physically or wirelessly to the vehicle.

Figure 1B:
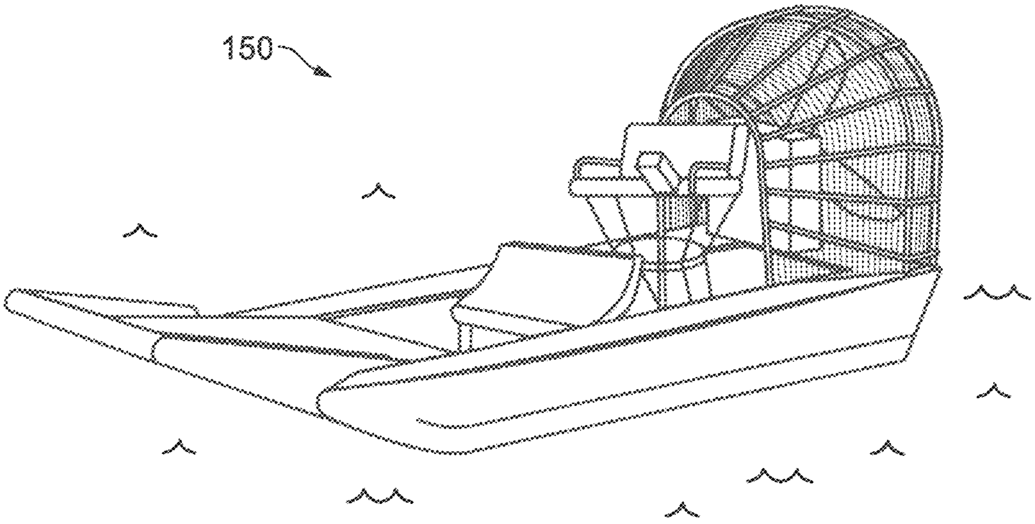

FIGS. 1A and 1B show non-limiting examples of platforms on which embodiments of the present invention can be disposed. FIG. 1A shows a chassis 100 similar to a zero-turn tractor mower, the frame of which can be used as a platform. FIG. 1B shows an air boat 150.

Figure 2A:
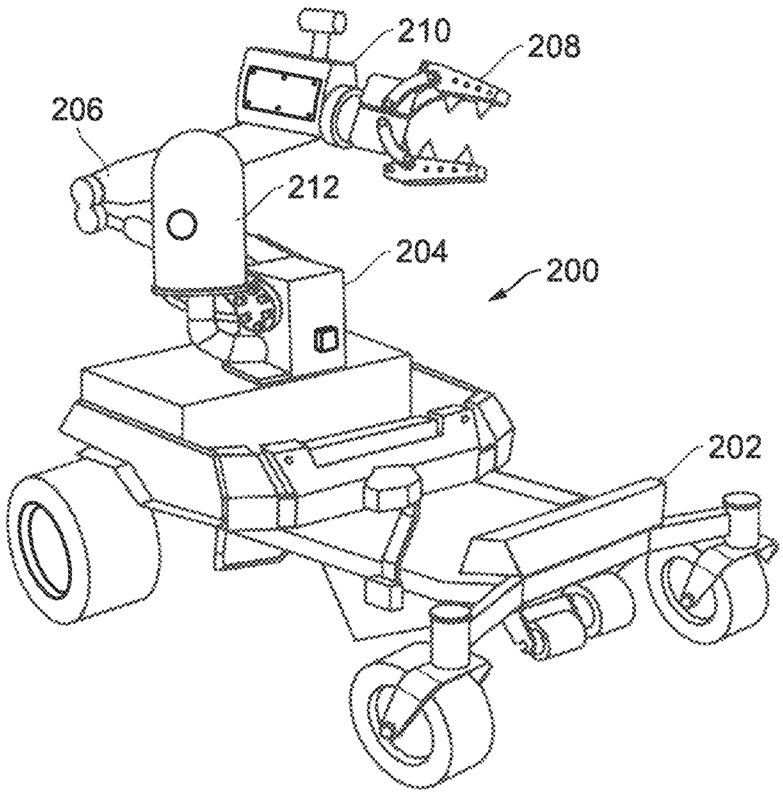
FIGS. 2A-2E show embodiments of the present invention disposed on non-limiting examples of platforms.

FIGS. 2A-2E show embodiments of the present invention disposed on non-limiting examples of platforms. FIG. 2A shows an embodiment of the present invention, an apparatus 200, disposed on a tractor mower frame 202 of a tractor mower such as tractor mower 100 or some other tractor mower. The apparatus 200 includes a heat source 204, a manipulator arm 206 disposed on the heat source 204, a gripper 208, an arm imager 210, and a capture imager 212.

Figure 2B:
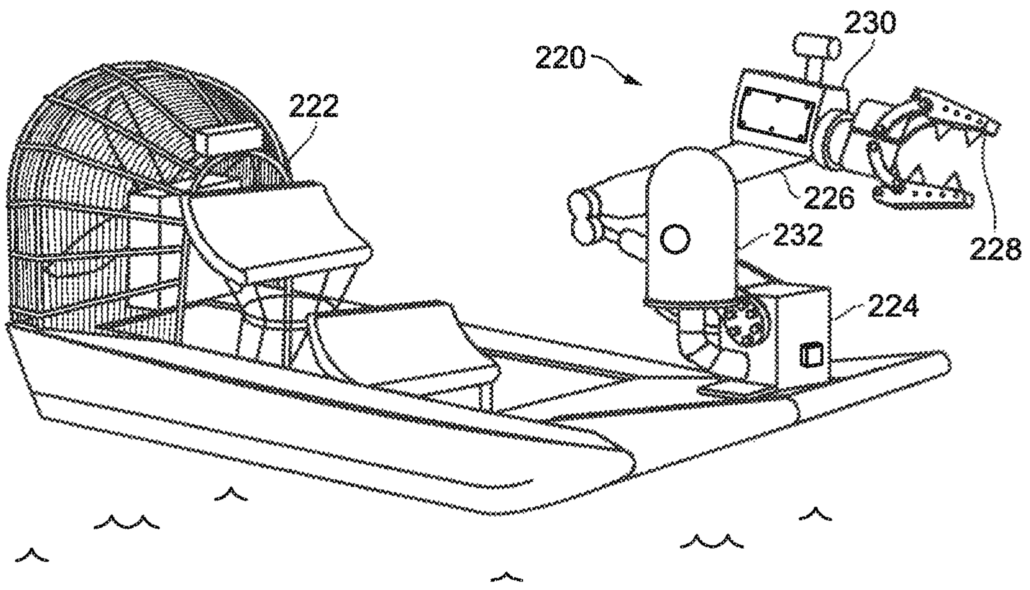

FIG. 2B shows another embodiment of the present invention, an apparatus 220, disposed on an air boat 222 such as air boat 150 of FIG. 1B or some other boat. The apparatus 220 includes a heat source 224, a manipulator arm 226 disposed on the heat source 224, a gripper 228, an arm imager 230, and a capture imager 232. A front seat (not shown) has been removed from the airboat 222 to provide a space for storage of captured reptiles.

Figure 2C:
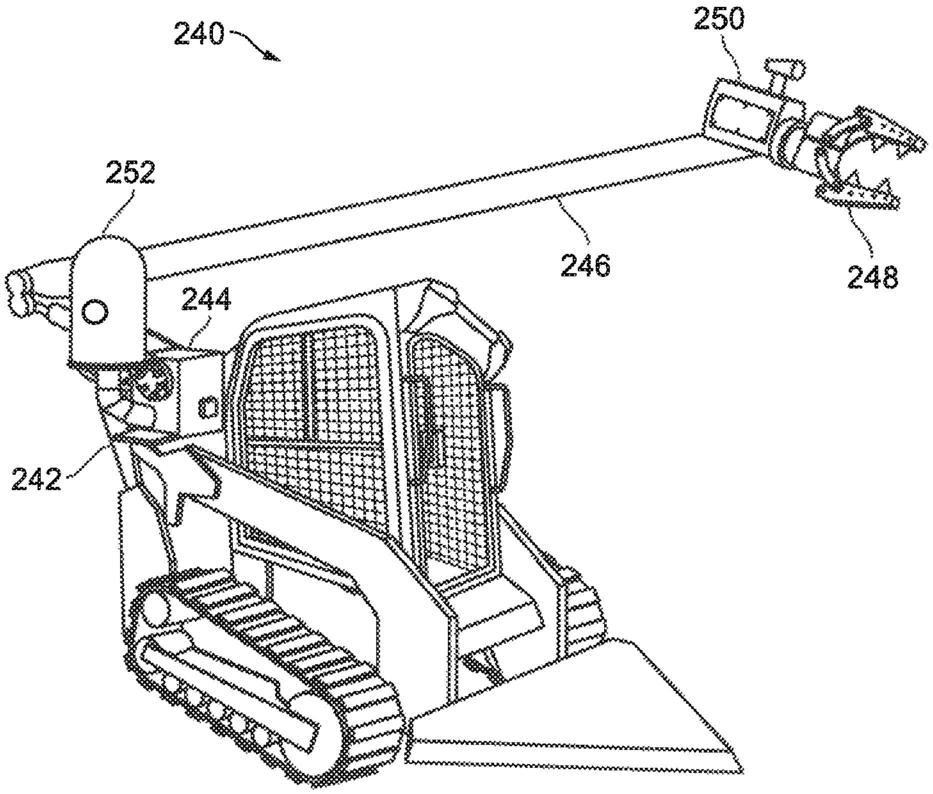

FIG. 2C shows another embodiment of the present invention, an apparatus 240, disposed on a compact mini-bulldozer 242. The apparatus 240 includes a heat source 244, a manipulator arm 246 disposed on the heat source 244, a gripper 238, an arm imager 250, and a capture imager 252. Lifting arms (not shown) have been removed from the mini-bulldozer 242 to show the tracks on both sides of the mini-bulldozer 242.

Figure 2D:
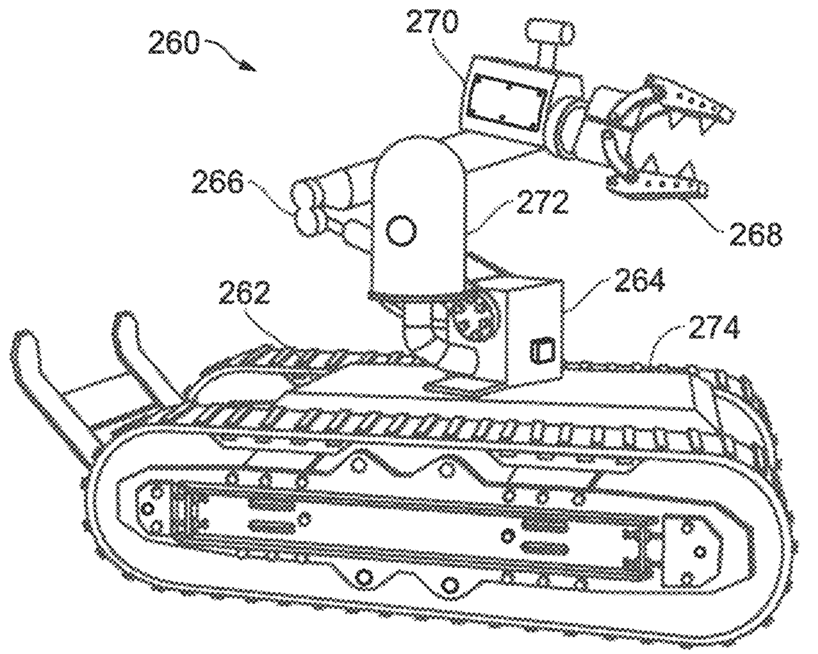

FIG. 2D shows another embodiment of the present invention, an apparatus 260, disposed on a tracked vehicle 262. The apparatus 260 includes a heat source 264, a manipulator arm 266 disposed on the heat source 264, a gripper 268, an arm imager 270, and a capture imager 272. FIG. 2D also shows an alternate location 274 on the bulldozer 242 for disposition of the heat source 244.

Figure 2E:
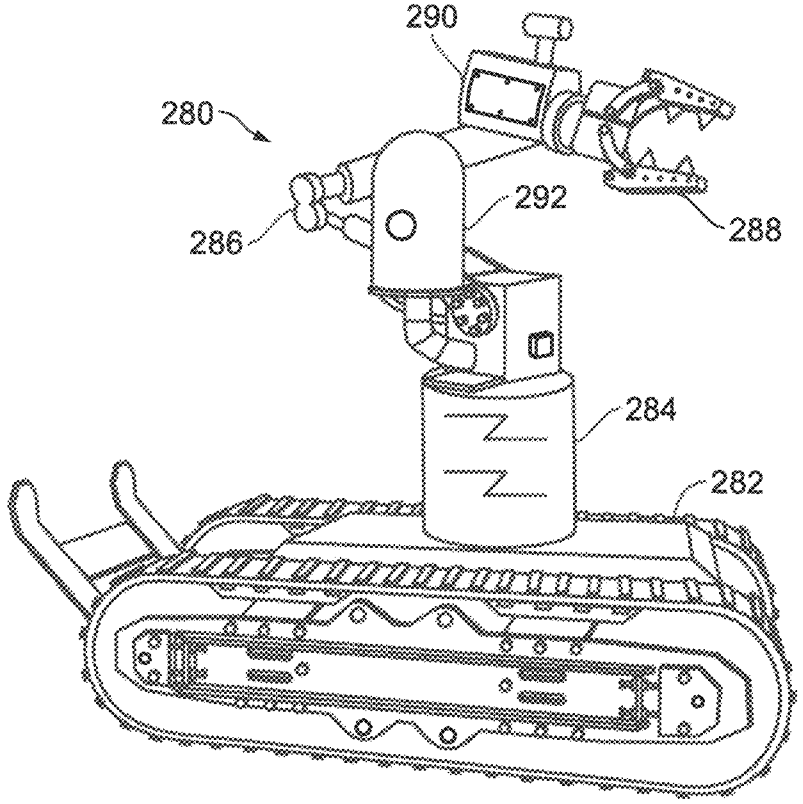

FIG. 2E shows another embodiment of the present invention, an apparatus 280, on a tracked vehicle 282. The apparatus 280 includes a heat source 284, a manipulator arm 286 disposed on the heat source 284, a gripper 288, an arm imager 290, and a capture imager 292.

An embodiment of the present invention includes a kit for an apparatus for attraction and disposition of reptiles. This kit includes components of the embodiments discussed herein, and in addition, one or more fasteners or one or more tools or both for disposing the components of the apparatus as discussed herein.

Figure 3:
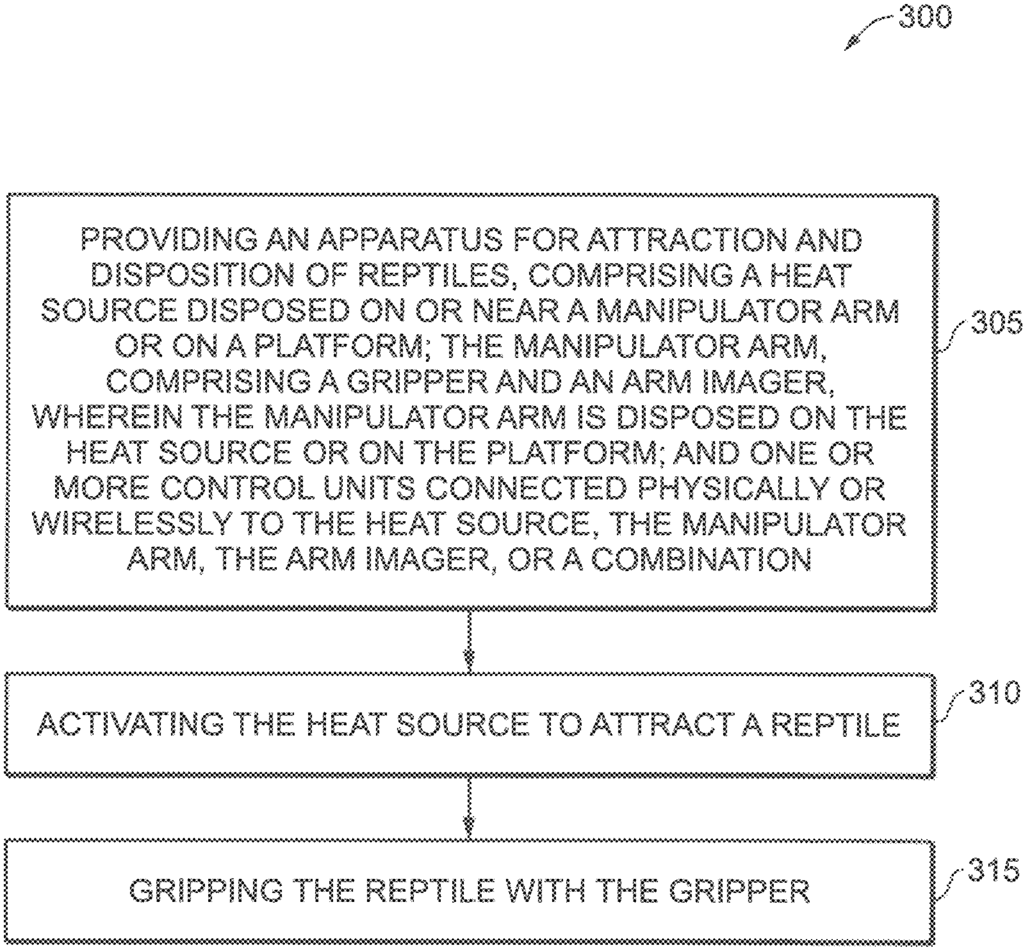
FIG. 3 shows a flowchart for a method embodiment of the present invention.

FIG. 3 shows a flowchart for a method embodiment of the present invention, method 300. The method 300 includes block 305, providing an apparatus for attraction and disposition of reptiles, comprising a heat source disposed on or near a manipulator arm or on a platform; the manipulator arm, comprising a gripper and an arm imager, wherein the manipulator arm is disposed on the heat source or on the platform; and one or more control units connected physically or wirelessly to the heat source, the manipulator arm, the arm imager, or a combination. Method 300 also includes block 310, activating the heat source to attract a reptile; and block 315, gripping the reptile with the gripper.

In general terms, embodiments of the present invention include a hand-held apparatus for attraction and disposition of reptiles. Embodiments of the present invention include a heat source, which can include, e.g., an electric heater or a reservoir of heated liquid such as water. The heat source simulates a prey mammal and attracts a reptile to within range of the hand-held apparatus. The heat source can be disposed on a hand-held rod of the hand-held apparatus. The hand-held apparatus also includes one or more devices for disposition of the reptile. Non-limiting examples include a gripper for gripping the reptile or a snare for snaring the reptile; one or more electrical sources, e.g., one or more batteries, and electrodes for immobilizing the reptile by stunning it with an electric shock, e.g. an electric shock device such as a TASER® electric shock device; and one or more reservoirs and one or more injection needles for delivering an anesthetic substance or a euthanizing substance to the reptile. Embodiments of the present invention can also include a capture imager, e.g., a second camera, disposed on the hand-held rod to image a capture of the reptile.

Further, embodiments of the present invention can include a scent decoy that generates and releases a scent to attract reptiles, disposed on the hand-held rod. Embodiments of the present invention can also include one or more motion detectors disposed on the hand-held rod to alert a user of the apparatus to the presence of a reptile.

Embodiments of the present invention further include one or more control units for operating components of the hand-held apparatus as described herein, connected physically or wirelessly to the components.

Figure 4:
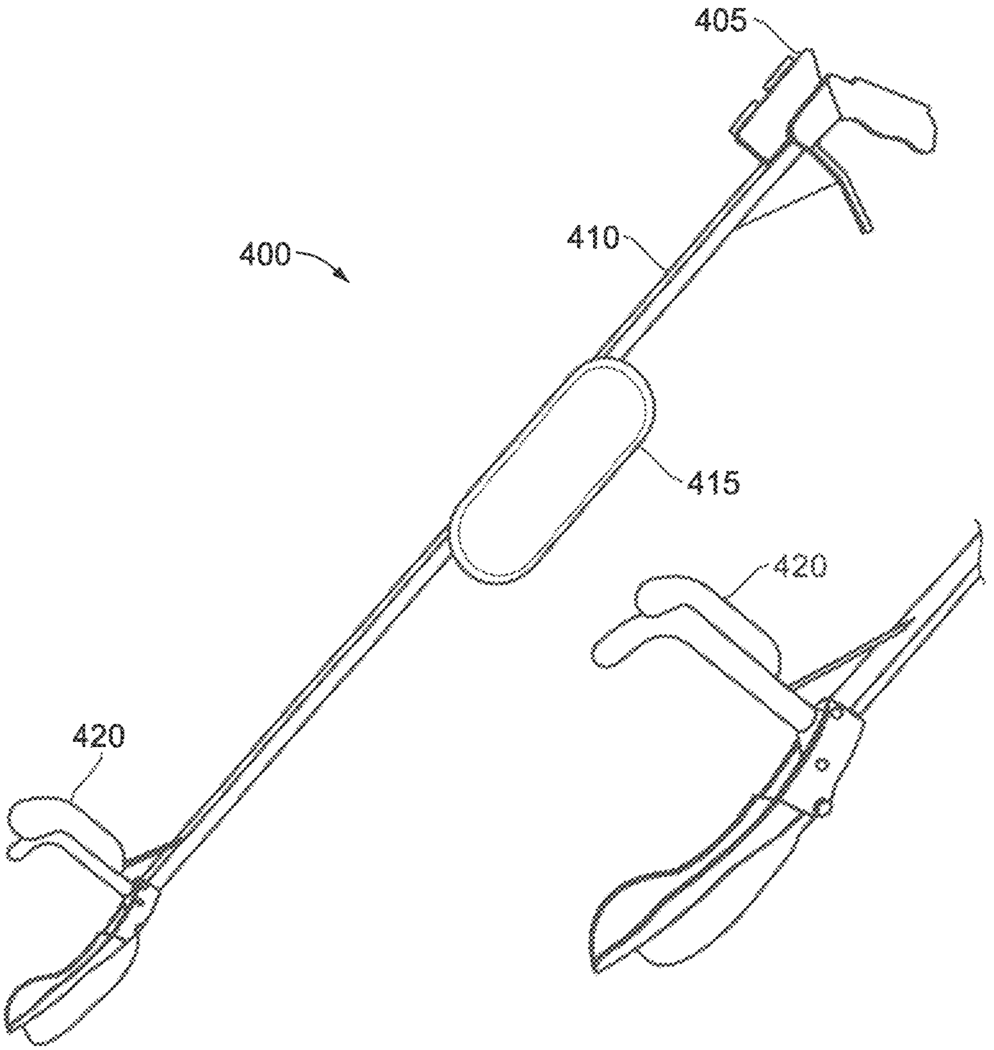
FIG. 4 shows another embodiment of the present invention.

FIG. 4 shows a hand-held embodiment of the present invention, a hand-held apparatus for disposition of reptiles 400. Apparatus 400 includes a control panel 405 mounted at a proximal end of a hand-held rod 410. The control panel 405 includes an on-off switch (not shown) and a temperature control (not shown). The proximal end of the hand-held rod 410 is the end closer to the user when the apparatus 400 is being used. A battery 415 is mounted on the hand-held rod 410. The battery 415 powers a heat source (not shown) or an electric shock device (not shown), e.g., a TASER® electric shock device, or both. The heat source is configured and disposed to attract a reptile, and the electric shock device is configured and disposed to stun or euthanize a reptile. A gripper 420 for capture and restraint of a reptile is mounted at the distal end of the hand-held rod 410.

Figure 5:
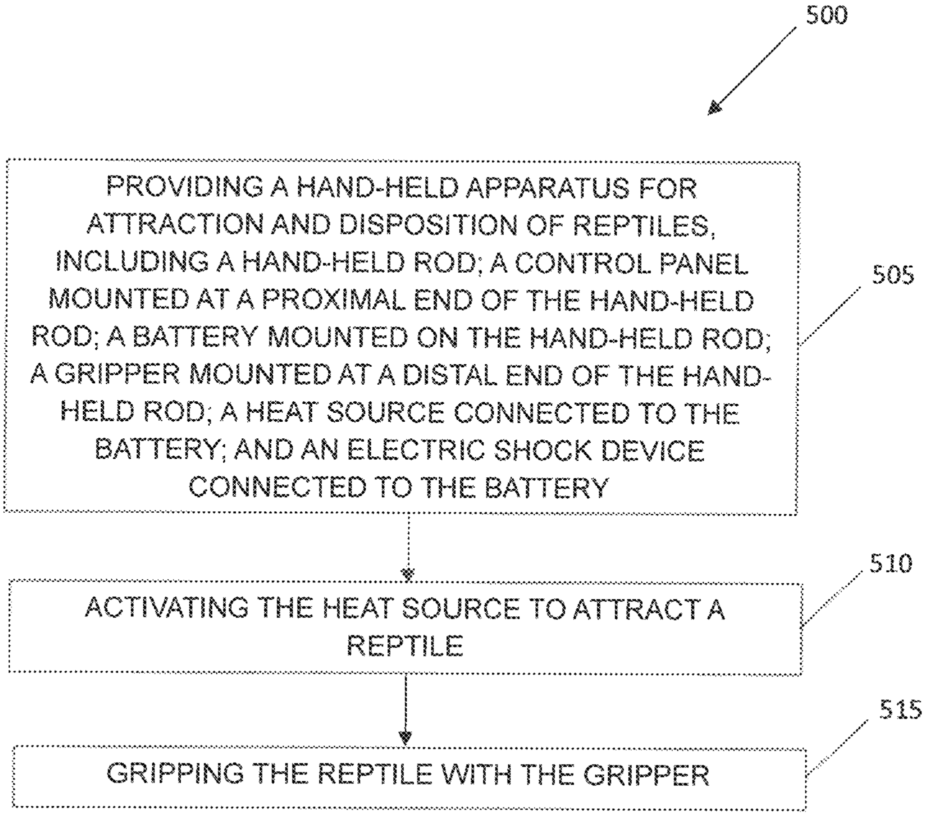
FIG. 5 shows a flowchart for another method of using an embodiment of the present invention.

FIG. 5 shows a flowchart for a method 500 for attraction and disposition of reptiles, e.g. hand-held apparatus 400. Method 500 includes block 505, providing a hand-held apparatus for attraction and disposition of reptiles, including a hand-held rod; a control panel mounted at a proximal end of the hand-held rod; a battery mounted on the hand-held rod; a gripper mounted at a distal end of the hand-held rod; a heat source connected to the battery; and an electric shock device connected to the battery. Block 510 includes activating the heat source to attract a reptile; and block 515 includes gripping the reptile with the gripper.

Figure 6:
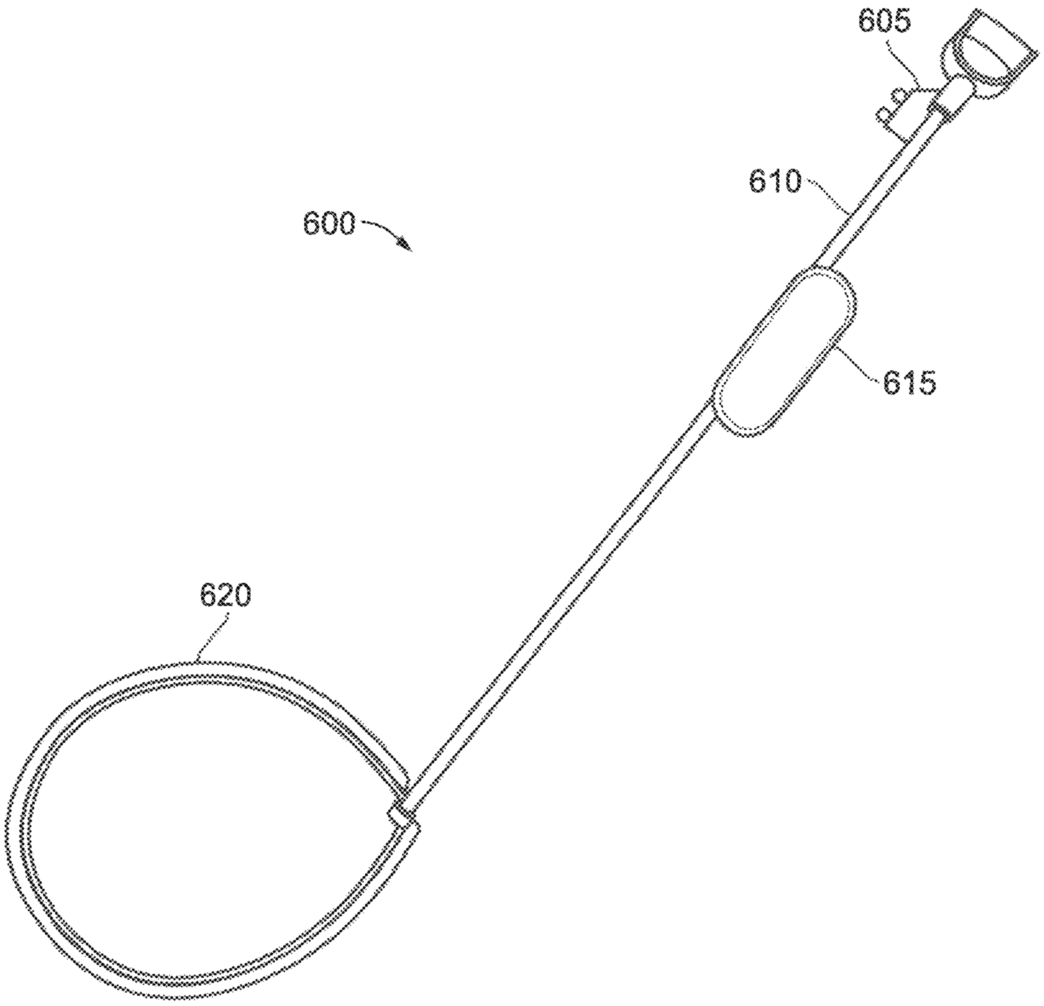
FIG. 6 shows a further embodiment of the present invention.

FIG. 6 shows another hand-held embodiment of the present invention, a hand-held apparatus for disposition of reptiles 600. Apparatus 600 includes a control panel 605 mounted at a proximal end of a hand-held rod 610. The control panel 605 includes an on-off switch (not shown) and a temperature control (not shown). The proximal end of the hand-held rod 610 is the end closer to the user when the apparatus 600 is being used. A battery 515 is mounted on the hand-held rod 410 between the proximal end and the distal end of the hand-held rod 410. The battery 415 powers a heat generator (which may be a snare 620 discussed below; otherwise not shown) or an electric shock device (not shown), e.g., a TASER® electric shock device, or both. The heat generator is configured and disposed to attract a reptile, and the electric shock device is configured and disposed to stun or euthanize a reptile. A snare 620 for capture and restraint of a reptile is mounted at the distal end of the hand-held rod 610.

Figure 7:
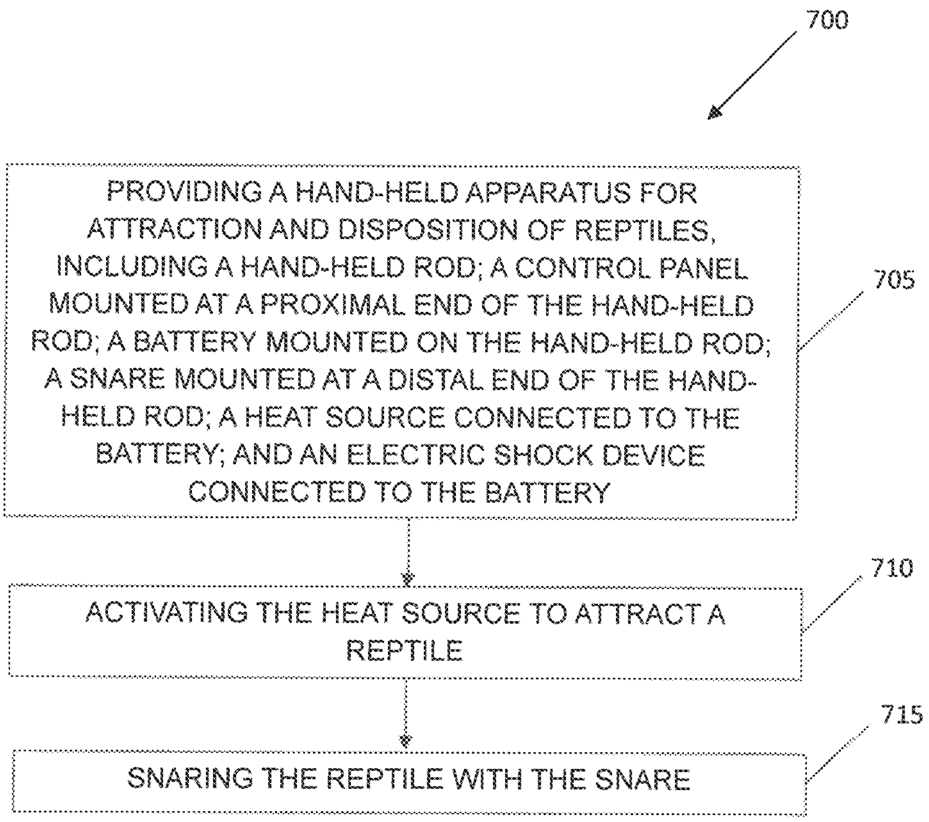
FIG. 7 shows a flowchart for still another method of using an embodiment of the present invention.

FIG. 7 shows a flowchart for a method 700 for attraction and disposition of reptiles, e.g. hand-held apparatus 600. Method 700 includes block 705, providing a hand-held apparatus for attraction and disposition of reptiles, including a hand-held rod; a control panel mounted at a proximal end of the hand-held rod; a battery mounted on the hand-held rod; a gripper mounted at a distal end of the hand-held rod; a heat source connected to the battery; and an electric shock device connected to the battery. Block 710 includes activating the heat source to attract a reptile; and block 715 includes gripping the reptile with the gripper.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A hand-held apparatus for attraction and disposition of reptiles, comprising:

- a hand-held rod;
- a control panel mounted at a proximal end of the hand-held rod;
- a battery mounted on the hand-held rod;
- a gripper or a snare mounted at a distal end of the hand-held rod;
- a heat source connected to the battery; and
- an electric shock device connected to the battery.

2. A method for attraction and disposition of reptiles, comprising:

- providing a hand-held apparatus for attraction and disposition of reptiles, comprising:
  - a hand-held rod;
  - a control panel mounted at a proximal end of the hand-held rod;

a battery mounted on the hand-held rod;

a gripper or a snare mounted at a distal end of the hand-held rod;

a heat source connected to the battery; and an electric shock device connected to the battery;

activating the heat source to attract a reptile; and gripping the reptile with the gripper or snaring the reptile with the snare.

* * * * *